United States Patent
Paik et al.

(10) Patent No.: US 6,767,393 B2
(45) Date of Patent: Jul. 27, 2004

(54) SELF-SHINING AEROSOL-TYPE SHOE POLISH COMPOSITION

(75) Inventors: Soon-Ki Paik, #922, Youngduk-ri, Kiheung-eup, Yongin-si, Kyungki-do (KR), 449-900; Jeon-Woon Bae, Yongin-si (KR)

(73) Assignee: Soon-Ki Paik (KR)

( * ) Notice: Subject to any disclaimer, the term of this patent is extended or adjusted under 35 U.S.C. 154(b) by 11 days.

(21) Appl. No.: 10/338,532

(22) Filed: Jan. 7, 2003

(65) Prior Publication Data

US 2003/0131754 A1 Jul. 17, 2003

(30) Foreign Application Priority Data

Jan. 7, 2002 (KR) .............................. 2002-721

(51) Int. Cl.⁷ ............................... A47L 23/00
(52) U.S. Cl. ................. 106/3; 106/11; 106/287.11; 106/287.12; 106/287.13; 106/287.14; 106/287.15; 106/287.16; 516/1; 516/8
(58) Field of Search .............. 516/1, 8; 106/3, 106/11, 287.11, 287.12, 287.13, 287.14, 287.15, 287.16

(56) References Cited

U.S. PATENT DOCUMENTS 3,503,761 A * 3/1970 Schumacher ................... 106/8
3,697,434 A * 10/1972 Sydney ....................... 252/700
3,929,492 A * 12/1975 Chapman et al. ............. 106/3

OTHER PUBLICATIONS

Abstract for JP 6–192575, Jul. 1994.*
Abstract for 8–134419, May 1996.*

* cited by examiner

Primary Examiner—C. Melissa Koslow
(74) Attorney, Agent, or Firm—Anderson Kill & Olick, PC

(57) ABSTRACT

A self-shining aerosol-type shoe polish composition consisting essentially of 0.5 to 25% by volume of a silicone compound, optionally 3 to 25% by volume of a drying retardant and/or 0.1 to 1% by volume of an anti-static agent component, and the remainder of liquefied gas as a solvent as well as a propellant gas, exhibits excellent drying properties and self-shining effect when sprayed on the surface of shoes.

6 Claims, No Drawings

SELF-SHINING AEROSOL-TYPE SHOE POLISH COMPOSITION

FIELD OF THE INVENTION

The present invention relates to a self-shining aerosol-type shoe polish composition, which comprises a liquefied gas as a solvent as well as a propellant gas without auxiliary solvent conventionally used.

BACKGROUND OF THE INVENTION

Aerosol-type polishes have been extensively used for polishing shoes, automobiles, household care, etc. Conventionally, an aerosol is prepared by injecting a stock solution and a liquefied propellant gas, which serves to spray the stock solution with a suitable pressure, into a container under a predetermined pressure.

Stock solution is generally prepared by dissolving an effective component in a solvent such as petroleum fraction, alcohol, water and synthetic solvent. The content of such stock solution in an aerosol-type polish composition is normally 55 to 70% by volume based on the total polish composition.

On the other hand, the propellant gas may be LPG (liquefied petroleum gas), DME (dimethylether), Freon or carbon dioxide gas. $CO_2$ gas is not liquefied at room temperature but may dissolve in a specific solvent to a high degree, and therefore, can play a role in blasting aerosol when sprayed. The propellant gas should be selected in consideration of the miscibility with the stock solution to optimize the effectiveness of spraying, liquefying pressure, cost, etc.

Conventional aerosol-type polish compositions for automobile and household care products are prepared by mixing LPG as a propellant gas and a stock solution comprising a silicone compound as an effective component, and a solvent selected from the group consisting of dearomatized kerocene, naphtha and alcohol; or by mixing DME as a propellant gas with a silicone emulsion diluted to 1 to 50% by volume with water or alcohol as a stock solution. Such aerosol compositions consist of 50 to 70% by volume of the stock solution and the remainder of liquefied propellant gas.

However, when the above conventional aerosol-type polish composition is used for polishing shoes, it needs a long drying time as well as an additional polishing step using dry cloth.

SUMMARY OF THE INVENTION

Accordingly, it is a primary object of the present invention to provide an aerosol-type shoe polish composition having a reduced drying time and improved self-shining characteristics.

The above object of the invention can be accomplished by providing a self-shining aerosol-type shoe polish composition consisting essentially of 0.5 to 25% by volume of a silicone compound, optionally 3 to 25% by volume of a drying retardant and/or 0.1 to 1% by volume of an anti-static agent component, and the remainder of liquefied gas which also functions as a solvent as well as a propellant gas, whereby the aerosol composition is dispersed finely when sprayed, and applied uniformly to the surface of shoes.

DETAILED DESCRIPTION OF THE INVENTION

The self-shining aerosol-type shoe polish composition in accordance with the present invention comprises a silicone compound as an effective component, a drying retardant and liquefied gas without any other solvent.

In the self-shining aerosol-type shoe polish composition in accordance with the present invention, a silicone compound is employed as an effective component. Preferably, silicone compounds which may be used in the present invention include a silicone oil, a water-soluble silicone oil, a modified silicone oil, a silicone wax, a silicone resin and a mixture thereof. As a liquefied gas component in the composition, LPG, DME or a mixture thereof is preferred; and as a drying retardant, pentane, hexane, a silicone oil having the boiling point in the range of 60 to 150° and the surface tension in the range of 15 to 25 dyne/cm, and a mixture thereof may be used.

When the conventional aerosol-type polish composition is sprayed, the polishing component is applied on the surface of shoes uniformly and shines the shoes with vaporization of the liquefied propellant gas component. Since the liquefied propellant gas has a tendency to vaporize instantaneously when sprayed into atmosphere, the effective component droplet becomes chilled and thickened very fast, which makes the shining layer formed on the surface of shoes be withdrawn minutely, whereby the polishing effect of the polish component may become worse and the surface of the shoes gets uneven. In order to solve the above-mentioned problems, the self-shining aerosol-type shoe polish composition in accordance with the present invention further comprises a drying retardant. As a drying retardant, hexane is preferred since its boiling point and surface tension are in the range of 65 to 70° and in the range of 17 to 19 dyne/cm, respectively. Compared with pure water having the surface tension of 73 dyne/cm or a surfactant added water having the surface tension of 35 to 40 dyne/cm, hexane shows excellent wetting and leveling effects. The low surface tension of hexane makes it possible to produce thin and uniform layer formation, thereby increasing the polishing effect. Also, the moderate heat of vaporization and the suitable vaporizing rate of hexane prevent the effective component from excessively rapidly cooling and thickening due to instantaneous vaporization of the liquefied propellant gas.

In order to prevent the aggregation of dust on the shoe surface, the aerosol-type shoe polish composition in accordance with the present invention may further comprise 0.1 to 1% by volume of an anti-static agent component, for example, a positively-charged silicone compound such as polyether functionalized silicones (PFS), since the dust in the air has a positive charge.

In a preferred embodiment, the content of silicone compound in the polish composition of the present invention is in the range of 0.5 to 25% by volume based on the total polish composition. If the content of silicone compound is less than 0.5% by volume, the polishing and water repellent effect may not be satisfactory, while if it is higher than 25% by volume, the polishing layer formed on the surface becomes excessively thick, giving rise to scattered reflection and drying problem.

Preferably, the content of drying retardant component is in the range of 3 to 25% by volume based on the total aerosol-type polish composition. If the content of drying retardant is less than 3% by volume, the retarding effect may be insufficient, while if it is higher than 25% by volume, the silicone oil layer may be contaminated due to excessive retardation of drying.

The present invention is further described and illustrated in Examples provided below, which are, however, not intended to limit the scope of the present invention.

EXAMPLES 1 to 7

The self-shining aerosol-type polish compositions of Examples 1 to 7 were prepared by injecting the components into the container at the ratios described in Table 1. In the Examples, a 6:2:2 mixture of polydimethylsiloxane DC200/1,000 and DC200/60,000® (Dow Corning Corporation), having the viscosity of 1,000 and 60,000 Storks/cm, respectively, and polyphenylsiloxane DC556® (Dow Corning Corporation); a 6:4 mixture of propane and butane; and n-hexane are used as a silicone compound, liquefied propellant gas and drying retardant, respectively. Polyether functionalised silicone (PFS) is added as an anti-static agent in Example 7. The content of each component is represented in terms of % by volume.

The degrees of gloss of each of the shoe surfaces applied with the polish compositions of Example 1 to 7 were measured after instantaneous drying and 24 hours, respectively, using gloss meter with 60 degrees reflection geometry, to evaluate the self-shining effect and the retention period thereof.

TABLE 1

Compositions of the aerosol-type shoe polish of Examples 1 to 7.

|  | Ex. 1 | Ex. 2 | Ex. 3 | Ex. 4 | Ex. 5 | Ex. 6 | Ex. 7 |
| --- | --- | --- | --- | --- | --- | --- | --- |
| Silicone compound (6:2:2 mixture of DC 200/1000, DC 200/60,000 and DC 556) | 0.5 | 2.5 | 7.5 | 25.0 | 7.5 | 7.5 | 7.5 |
| 4:6 mixture of propane:butane | 98.5 | 92.5 | 77.5 | 50.0 | 89.5 | 67.5 | 77.2 |
| n-Hexane | 1.0 | 5.0 | 15.0 | 25.0 | 3.0 | 25.0 | 15.0 |
| PFS | — | — | — | — | — | — | 0.3 |
| Total | 100.0 | 100.0 | 100.0 | 100.0 | 100.0 | 100.0 | 100.0 |
| Gloss (after drying), % | 83 | 88 | 98 | 95 | 95 | 95 | 98 |
| Gloss (after 24 hours), % | 80 | 87 | 95 | 92 | 92 | 94 | 97 |

When the aerosol-type shoe polish compositions of Examples 1 to 7 were sprayed on the surface of shoes, the drying property and the self-shining effect of the composition were enhanced. In Example 7, the retention period of polishing effect was enhanced due to the dust-repellant effect of PFS.

While the invention has been described with respect to the above specific embodiments, it should be recognized that various modifications and changes may be made to the invention by those skilled in the art which also fall within the scope of the invention as defined by the appended claims.

What is claimed is:

1. A self-shining aerosol-type shoe polish composition consisting essentially of 0.5 to 25% by volume of a silicone compound, optionally 3 to 25% by volume of a drying retardant and/or 0.1 to 1% by volume of an anti-static agent component, and the remainder of liquefied gas as a solvent as well as a propellant gas.

2. The self-shining aerosol-type shoe polish composition of claim 1, wherein said silicone compound is selected from the group consisting of a silicone oil, a water-soluble silicone oil, a modified silicone oil, a silicone wax, a silicone resin and a mixture thereof.

3. The self-shining aerosol-type shoe polish composition of claim 1, wherein said drying retardant is selected from the group consisting of pentane, hexane, a volatile silicone oil having the boiling point in the range of 60 to 150° and the surface tension in the range of 15 to 25 dyne/cm, and a mixture thereof.

4. The self-shining aerosol-type shoe polish composition of claim 1, wherein said liquefied gas is selected from the group consisting of LPG (liquefied petroleum gas), DME (dimethylether) and a mixture thereof.

5. The self-shining aerosol-type shoe polish composition of claim 1, wherein said anti-static agent is a positively-charged silicone compound.

6. The self-shining aerosol-type shoe polish composition of claim 5, wherein said positively-charged silicone compound is a polyether functionalized silicone.

* * * * *